United States Patent
Hagendoorn et al.

(10) Patent No.: US 12,474,197 B2
(45) Date of Patent: Nov. 18, 2025

(54) APPARATUS FOR WEIGHING POULTRY MOVING IN A CONVEYOR LINE

(71) Applicant: Meyn Food Processing Technology B.V., Oostzaan (NL)

(72) Inventors: Jan Willem Hagendoorn, Oostzaan (NL); Aloysius Christianus Maria Van Steijn, Oostzaan (NL); Izzet Ozkan, Oostzaan (NL); Patrick Keesman, Oostzaan (NL); Eric De Jong, Oostzaan (NL); Nico Willem Van Vliet, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 347 days.

(21) Appl. No.: 18/208,408

(22) Filed: Jun. 12, 2023

(65) Prior Publication Data

US 2023/0400345 A1   Dec. 14, 2023

(30) Foreign Application Priority Data

Jun. 13, 2022  (NL) ...................................... 2032142

(51) Int. Cl.
G01G 17/08 (2006.01)
G01G 19/18 (2006.01)

(52) U.S. Cl.
CPC ............ G01G 17/08 (2013.01); G01G 19/18 (2013.01)

(58) Field of Classification Search
CPC ........ G01G 17/08; G01G 19/06; G01G 19/18; A22C 21/0053
See application file for complete search history.

(56) References Cited

U.S. PATENT DOCUMENTS

| | | | | | |
|---|---|---|---|---|---|
| 3,997,013 | A | * | 12/1976 | Brook | ....................... B07C 5/18 |
| | | | | | 177/52 |
| 4,096,950 | A | * | 6/1978 | Brook | .................... G01G 19/18 |
| | | | | | 209/617 |
| 4,488,635 | A | * | 12/1984 | Linville | ................. G01G 19/03 |
| | | | | | 177/52 |

(Continued)

FOREIGN PATENT DOCUMENTS

| CN | 209 214 735 U | 8/2019 |
|---|---|---|
| GB | 2 125 174 B | 2/1984 |
| WO | WO 2013/154427 | 10/2013 |

OTHER PUBLICATIONS

NL Search Report, 10 pages, Dec. 14, 2022.

*Primary Examiner* — Natalie Huls
(74) *Attorney, Agent, or Firm* — Dority & Manning, P.A.

(57) ABSTRACT

An apparatus for weighing poultry in a conveyor line can include carriers for the poultry, linked to each other by a driving chain. The conveyor line can include at least a curved track section and a weighing track section, wherein a weighing station is located along the weighing track section. A chain tension control mechanism can include a rotatable wheel having its circumference following the curved track section and pass the weighing track section, which rotatable wheel can support a series of engaging units that engage the chain and/or the carriers in the curved track section to tension the chain and disengage the chain and/or the carriers in the weighing track section to release tension in the chain.

9 Claims, 5 Drawing Sheets

(56) References Cited

U.S. PATENT DOCUMENTS

| | | | |
|---|---|---|---|
| 5,037,351 A * | 8/1991 | Van Den Nieuwelaar | .................. A22C 21/00 452/179 |
| 5,672,098 A | 9/1997 | Veraart | |
| 6,689,963 B2 * | 2/2004 | Brook | ..................... G01G 19/14 177/145 |
| 9,658,098 B2 * | 5/2017 | Peters | ................. A22C 21/0053 |
| 2017/0299421 A1 * | 10/2017 | Gillespie | .............. A22B 5/0064 |

* cited by examiner

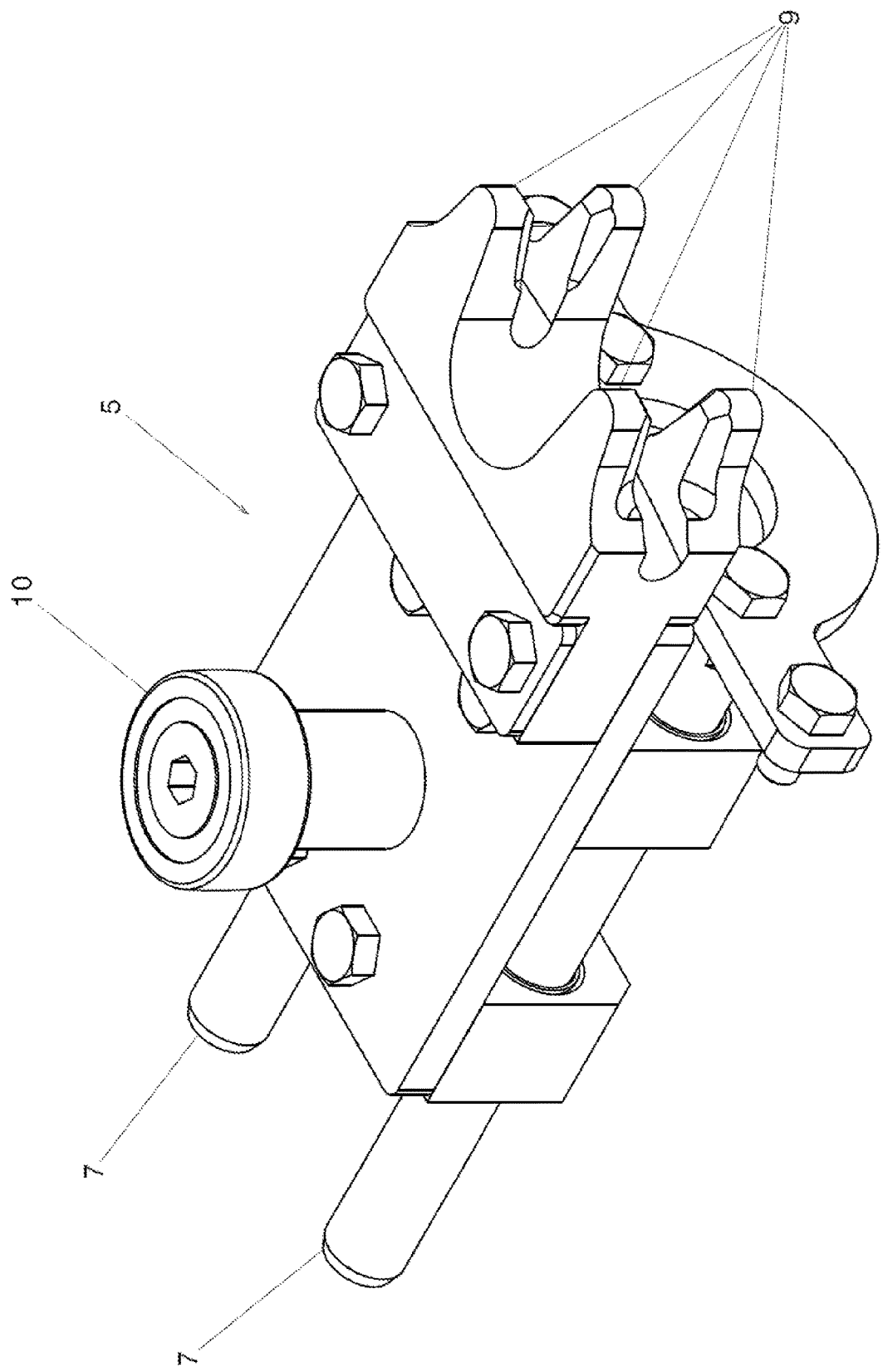

APPARATUS FOR WEIGHING POULTRY MOVING IN A CONVEYOR LINE

PRIORITY STATEMENT

The present application claims priority under 35 U.S.C. § 119 to Dutch Patent Application No. 2032142, filed Jun. 13, 2022.

FIELD OF THE INVENTION

The subject matter of the present disclosure relates generally to an apparatus for weighing poultry in a conveyor line.

BACKGROUND OF THE INVENTION

An apparatus for poultry weighing is disclosed by GB 2 125 174 B, and by WO 2013/154427, documents that are about 30 years apart, which demonstrates that the industry is continuously looking for improvement of the weighing operation on the poultry while it is moving in the conveyor line.

The chain tension control mechanism serves the purpose to reduce inaccuracies during the weighing operation which are caused by the chain obscuring the weight measurement. As particularly WO 2013/154427 demonstrates, the prior art has evolved into a complicated and accordingly relatively costly solution. The construction of WO 2013/154427 with two subsequent pulleys defining a path following two curved track sections in opposite directions, and a weighing track section in between those two curved track sections may disadvantageously give rise to swinging of the poultry, which is undesirable since it deteriorates the accuracy of the weight measurement. It also poses a risk of cross-contamination between the conveyed poultry, because their swinging may result in neighbouring poultry touching each other.

BRIEF DESCRIPTION OF THE INVENTION

Aspects and advantages of the invention will be set forth in part in the following description, or may be obvious from the description, or may be learned through practice of the invention.

In one exemplary aspect, it is an object of the invention to simplify the design of the apparatus for weighing poultry when moving in a conveyor line, and to realize cost benefits without compromising the weight accuracy.

In another exemplary aspect, it is further an object of the invention to prevent progressive swinging motion of the poultry while being conveyed, particularly when passing through the weighing station.

The subject matter of the present disclosure relates generally to an apparatus for weighing poultry in a conveyor line.

In one exemplary embodiment, the present invention can include carriers for the poultry, which carriers are linked to each other by a driving chain. The conveyor line can include a curved track section and a weighing track section, wherein a weighing station is located along the weighing track section. The apparatus can further include a chain tension control mechanism that alleviates tension in the driving chain at or near the weighing station along the weighing track section.

In another exemplary aspect, the chain tension control mechanism can include a rotatable wheel having its circumference following the curved track section and passing the weighing track section. The rotatable wheel can supports a series of engaging units that engage the chain and/or the carriers in the curved track section to tension the chain and is disengaged from the chain and the carriers in the weighing track section to release tension in the chain. With such a straightforward solution it is possible to avoid the complicated machinery of the prior art, whereas its effectiveness is uncompromised.

Suitably the engaging units may be movable in a radial direction of the rotatable wheel for engaging and disengaging the chain and/or the carriers.

In another suitable embodiment, the engaging units may be slidably mounted on shafts that are provided on the rotatable wheel.

In another exemplary embodiment of the apparatus of the invention, the apparatus can include a stationary guide ring and the engaging units that are supported by the rotatable wheel are each provided with a guide wheel running in a track of the stationary guide ring. This enables that the track on the stationary guide ring can cause the engaging units to engage the chain and/or the carrier in the curved track section, and to be disengaged from the chain and the carriers in the weighing track section. This can provide an effective and reliable way to have the engaging units operate on the chain and/or the carriers exactly at the desired moment, that is when the poultry is passing the weighing station at the weighing track section.

To accommodate any possible curvature that may be applied in the curved track section, in some embodiments the track of the stationary guide ring which causes radial movement of the engaging units with reference to the rotatable wheel, has a first track section and a second track section wherein the first track section is farther away from a rotational axle of the rotatable wheel than the second track section so as to arrange that the first track section causes tensioning of the chain and the second track section causes releasing tension in the chain.

In another exemplary embodiment, the weighing track section may be delimited both at its entry section and at its exit section with at least part of the curved track section. Since the weighing track section represents the shortest distance possible between the curved track sections on the opposite ends of the weighing track section, this measure contributes to releasing the tension in the chain when this part of the chain is in the region of the weighing track section.

To support the accuracy of the weight measurement it is preferred that the weighing track section is free from a direct connection with the curved track section, particularly when the weighing track section is suitably provided with a load cell of the weighing station.

The apparatus of the invention is therefore provided with features according to one or more of the appended claims. These and other features, aspects and advantages of the present invention will become better understood with reference to the following description and appended claims. The accompanying drawings, which care incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of an apparatus according to the invention that is not limiting as to the appended claims.

In the drawings:

FIG. 2 shows one chain engaging unit of the apparatus of the invention;

Whenever in the FIGS. the same reference numerals are applied, these numerals refer to the same parts.

DETAILED DESCRIPTION

Figure 1A:
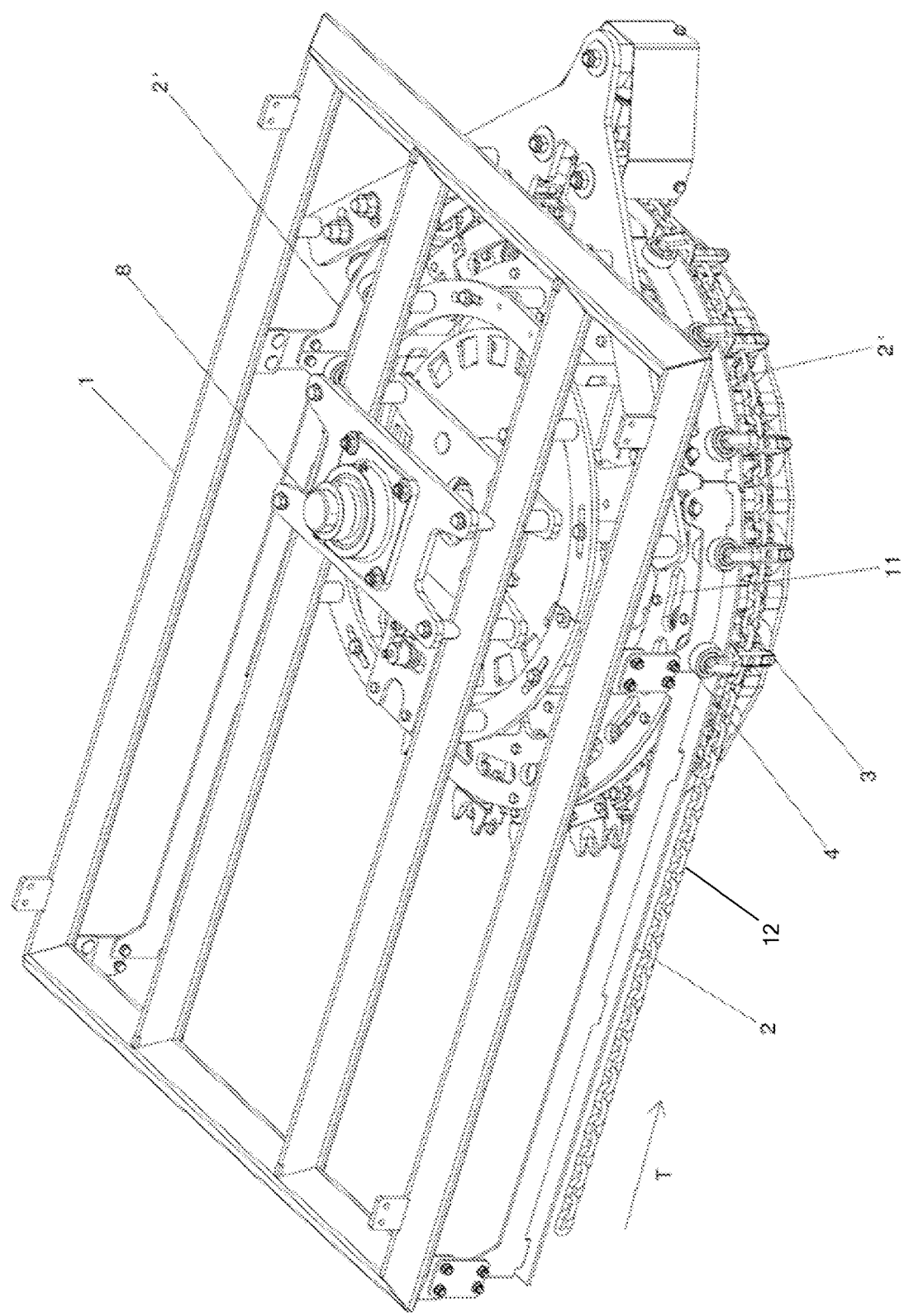
FIGS. 1A and 1B show an apparatus of the invention in an oblique top view and in a bottom view, respectively.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

Figure 1B:
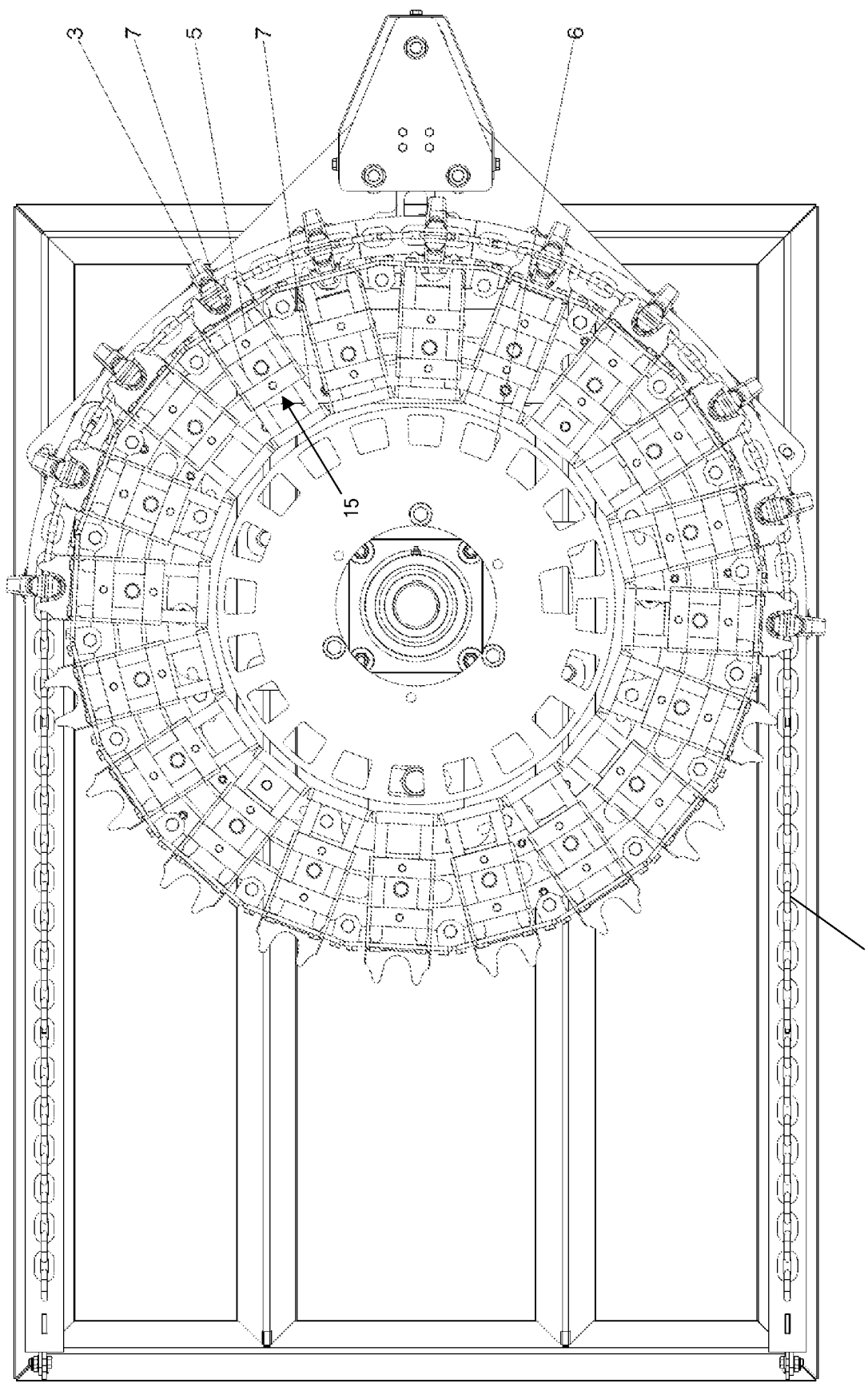

Turning first to FIG. 1A and FIG. 1B, it shows an exemplary embodiment of an apparatus 1 for weighing poultry (the poultry is not shown, but the skilled person is generally familiar with how poultry looks) that are conveyable by carriers 3 in a conveyor line 2 which usually is embodied with a T-track. This is however not essential. The carriers 3 are supported by wheels 4 that run in the track of the conveyor line 2, and the carriers 3 are linked to each other by a driving chain 12. The conveyor line 2 includes at least a curved track section 2' and a weighing track section 2", which is better shown in FIG. 3. A weighing station with a load cell 14 of the weighing station is located along the weighing track section 2", as depicted in FIG. 4. It is further shown in FIG. 4 that the weighing track section 2" is free from any direct connection with the curved track section 2'.

The exemplary apparatus 1 of this embodiment of the invention includes a chain 12 tension control mechanism that alleviates tension in the driving chain 12 in the part of the chain 12 being at or near the weighing station along the weighing track section 2".

According to this exemplary embodiment of the invention, the chain tension control mechanism includes a rotatable wheel 6 having its circumference 6' following part of the curved track section 2' and also passing the weighing track section 2" (see FIG. 1B and FIG. 3) where the weighing station is located. The rotatable wheel 6 supports a series of engaging units 5 that are movable on account of the rotation of the wheel 6 and also radially movable with reference to the wheel 6 so as to engage the chain 12 or carriers 3 in the curved track section 2' to tension the chain 12, and that disengage from the chain 12 and carriers 3 in the weighing track section 2" to release tension in the chain 12. This effect is preferably brought about by providing that the apparatus includes a stationary guide ring 11 (see FIG. 3) and that the engaging units 5 that are supported by the rotatable wheel 6 are each provided with a guide wheel 10 running in a track 13 of the stationary guide ring 11.

Figure 3:
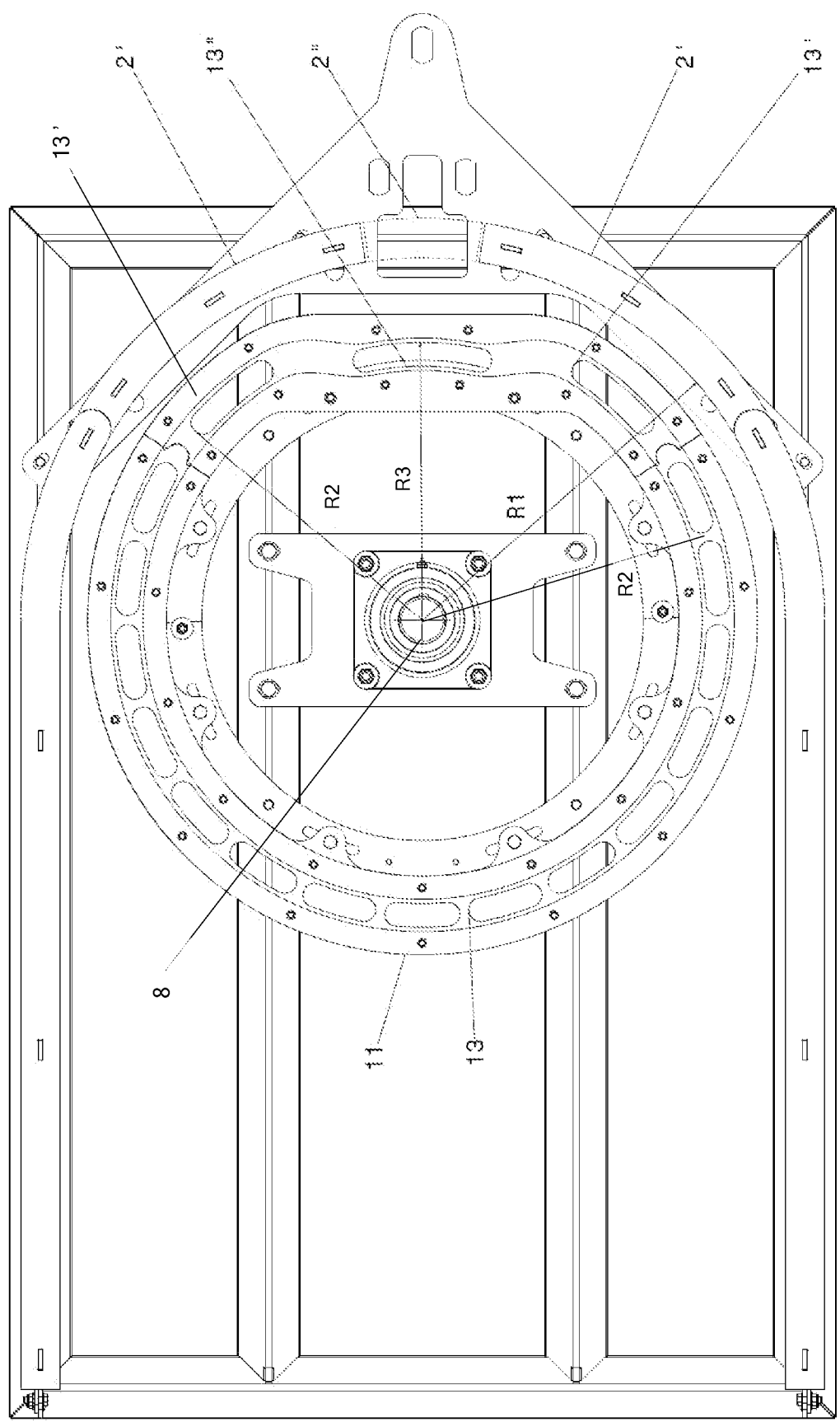
FIG. 3 shows a stationary guide ring for moving the chain engaging units of FIG. 2 in a radial direction of the guide ring.
Figure 4:
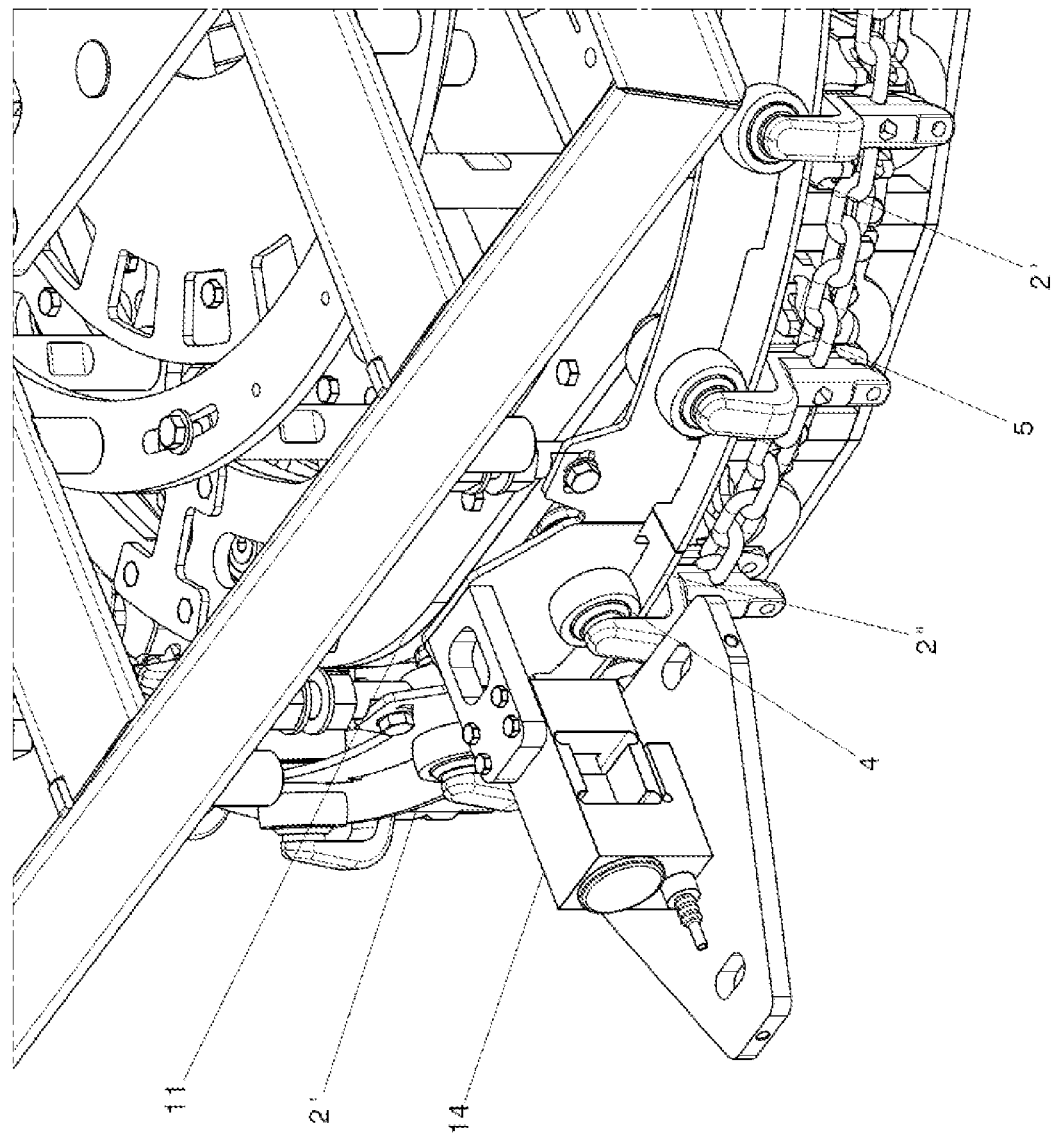
FIG. 4 shows a load cell at the weighing track section of the apparatus of the invention.

FIG. 3 shows that the track 13 which causes radial movement of the engaging units 5 with reference to the rotatable wheel 6 has a first track section 13' and a second track section 13", wherein the first track section 13' is farther away from a rotational axle 8 of the rotatable wheel 6 than the second track section 13" so as to arrange that the first track section 13' causes tensioning of the chain 12 and the second track section 13" causes releasing tension in the chain 12. It is thus the track 13 of the stationary guide ring 11 which causes that the engaging units 5 engage the chain 12 and/or the carrier 3 in the curved track section 2', and to disengage from the chain 12 and the carriers 3 in the weighing track section 2".

The weighing track section 2" is delimited at both its entry section and at its exit section with at least part of the curved track section 2'. Since the weighing track section 2" represents the shortest distance possible between the curved track sections 2' on the opposite ends of the weighing track section 2", this contributes to releasing the tension in the part of the chain 12 which is in the region of the weighing track section 2".

For this exemplary embodiment, the weighing track section 2" is delimited at both its entry section and at its exit section with at least part of the curved track section 2'. Since the weighing track section 2" represents the shortest distance possible between the curved track sections 2' on the opposite ends of the weighing track section 2", this contributes to releasing the tension in the part of the chain 12 which is in the region of the weighing track section 2". This also applies when the weighing track 5 section 2" is curved.

FIG. 2 shows that the exemplary engaging units 5 are slidable on shafts 7 that are at one end mounted to supports 15 on the rotatable wheel 6. This is however not essential. Also other ways of mounting the engaging units 5 on the rotatable wheel 6 are conceivable.

During use the exemplary apparatus 1 of the invention, an exemplary description of its operation is as follows.

As the carriers 3 are conveyed in a conveying direction T, they reach a curved track section 2' of the conveyor line 2. The chain 12 is driven by driven means as known in the art (not depicted) to convey the carriers 3 along the track. The curved track section has a radius R1. As the carriers 3 reach the curved track section 2', they are engaged by the engaging units 5. As explained above the engaging units 5 are slidably mounted on shafts 7 on the rotatable wheel 6. Thus, the engaging units 5 are conveyed along the curved track section 2' by rotation about a rotational axis 8 of the rotatable wheel 6, and are also radially movably relative to the axis 8 through sliding over the shafts 7.

As will be clear from combining FIG. 2 with FIG. 3, the guide track 13 of the stationary guide ring 11 guides the engaging units 5 via their wheels 10 that run in the guide track 13. The first guide track 13' exhibits a radius R2, and the second track section 13" near the weighing track section 2" is closer to the axle 8, e.g. by having a radius R3 which is smaller than R2. In a different embodiment the second track section 13" may be rectilinear.

As explained above, the carriers 3 are coupled to the driving chain 12 so that the carriers 3 move in the direction T towards the beginning of the curved track section 2'. There, the chain 12 engaging units 5, which are rotating together with the rotatable wheel 6, engage the chain 12 and/or the carriers 3 with their engaging means 9. The rotatable wheel 6 is arranged to rotate because the chain 12 drives the engaging units 5 as they are contacting the chain 12 of carriers. This means that there is no need for a separate actuator driving the wheel 6, although it can be added as long as the motion of the rotating motion of the engaging units 5 around axle 8 of the rotatable wheel 6 is synchronized with the motion of the carriers 3.

As the engaging units 5 are being conveyed, their guide wheel 10 is moved along the track 13 of the stationary guide ring 11. The engaging units 5 follow a curved path above the curved track section 2'. However, once a unit 5 reaches the weighing track section 2", the engaging units 5 slide radially toward the axle 8 of the rotating wheel 6 because the radius R3 of the track 13 near the location of the weighing track section 2" is smaller than the radius R2 of the track 13 following the curved track section 2'. Due to the radial inward movement of the engaging units 5, the chain 12 is released from the engaging means 9 of the engaging units 5 at the weighing track section 2'.

As the wheel 4 of a single carrier 3 reaches the weighing track section 2", the load cell 14 measures the weight of the carrier 3 transporting the poultry. Since at the weighing track section 2" the tension is removed from the chain 12, the distortion of the weight measurements due to the tension of the chain 12 is reduced. Once the single carrier 3 leaves the weighing track section 2", the engaging unit 5 moves again radially away from the rotation axle 8 of the rotatable wheel 6 and its engaging means 9 engages again the chain 12 or its carriers 3 to provide tension to the chain 12.

Exemplary embodiments of the present invention can include every combination of features that are disclosed herein independently from each other. Although the invention has been discussed in the foregoing with reference to an exemplary embodiment of the apparatus of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. An apparatus for weighing poultry in a conveyor line, comprising:
    carriers for the poultry, which carriers are linked to each other by a driving chain;
    a curved track section and weighing track section forming at least part of the conveyor line;
    a weighing station located along the weighing track section;
    a chain tension control mechanism that alleviates tension in the driving chain at or near the weighing station along the weighing track section, wherein the chain tension control mechanism comprises a rotatable wheel having its circumference following the curved track section and pass the weighing track section, which rotatable wheel supports a series of engaging units that engage the chain, the carriers, or both, in the curved track section to tension the chain and is disengaged from the chain and the carriers in the weighing track section to release tension in the chain.

2. The apparatus of claim 1, wherein the engaging units are movable in a radial direction of the rotatable wheel for engaging and disengaging the chain, the carriers, or both.

3. The apparatus of claim 1, wherein the engaging units are slidably mounted on shafts that are provided on the rotatable wheel.

4. The apparatus of claim 1, wherein the apparatus comprises a stationary guide ring and the engaging units that are supported by the rotatable wheel are each provided with a guide wheel running in a track of the stationary guide ring.

5. The apparatus of claim 4, wherein the track of the stationary guide ring is arranged to cause that the engaging units engage the chain and/or the carrier in the curved track section, and to disengage the chain, the carriers, or both, in the weighing track section.

6. The apparatus of claim 4, wherein the track which causes radial movement of the engaging units with reference to the rotatable wheel has a first track section and a second track section, wherein the first track section is farther away from a rotational axle of the rotatable wheel than the second track section so as to arrange that the first track section causes tensioning of the chain and the second track section causes releasing tension in the chain.

7. The apparatus of claim 1, wherein the weighing track section is delimited at its entry section and at its exit section with at least part of the curved track section.

8. The apparatus of claim 1, wherein the weighing track section is free from a direct connection with the curved track section.

9. The apparatus of claim 1, wherein the weighing station is provided with a load cell.

\* \* \* \* \*